(12) United States Patent
Hasegawa et al.

(10) Patent No.: US 9,444,314 B2
(45) Date of Patent: Sep. 13, 2016

(54) AUTOMOTIVE ROTARY ELECTRIC MACHINE AND STATOR MANUFACTURING METHOD THAT IS USED THEREFOR

(75) Inventors: Kazuya Hasegawa, Chiyoda-ku (JP); Kazunori Tanaka, Chiyoda-ku (JP); Yoshiro Imazawa, Chiyoda-ku (JP); Yoshihiro Harada, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 490 days.

(21) Appl. No.: 13/880,859

(22) PCT Filed: Dec. 14, 2010

(86) PCT No.: PCT/JP2010/072493
§ 371 (c)(1),
(2), (4) Date: Apr. 22, 2013

(87) PCT Pub. No.: WO2012/081087
PCT Pub. Date: Jun. 21, 2012

(65) Prior Publication Data
US 2013/0214634 A1   Aug. 22, 2013

(51) Int. Cl.
*H02K 3/12* (2006.01)
*H02K 15/06* (2006.01)
(Continued)

(52) U.S. Cl.
CPC .............. *H02K 15/062* (2013.01); *H02K 3/12* (2013.01); *H02K 15/0037* (2013.01);
(Continued)

(58) Field of Classification Search
CPC ............. H02K 15/0037; H02K 15/06; H02K 15/063; H02K 3/12; H02K 15/0435; H02K 15/026; H02K 15/062; Y10T 29/49009; Y10T 29/49011

USPC ................................. 310/208, 179, 180, 194
See application file for complete search history.

(56) References Cited

U.S. PATENT DOCUMENTS 6,314,780 B1 * 11/2001 Naka .................. H02K 15/0414
72/213
6,862,797 B2 * 3/2005 Neet ....................... H02K 3/12
29/596

(Continued)

FOREIGN PATENT DOCUMENTS

JP    55-37893 A    3/1980
JP    2003-88021 A    3/2003

(Continued)

OTHER PUBLICATIONS

Communication dated Nov. 25, 2014 from the Japanese Patent Office in counterpart application No. 2014-005156.

(Continued)

*Primary Examiner* — Alex W Mok
(74) *Attorney, Agent, or Firm* — Sughrue Mion, PLLC

(57) ABSTRACT

The stator winding has winding assemblies that are disposed in a stator core so as to be stacked in three or more layers in a radial direction such that slot-housed portions line up in single columns in a clot depth direction inside slots, and radial widths of return portions of the winding assemblies that are mounted so as to be stacked in a radial direction are made sequentially narrower in order of return portions of a winding assembly that is positioned centrally, return portions of a winding assembly that is positioned on an inner circumferential side, and return portions of a winding assembly that is positioned on an outer circumferential side.

5 Claims, 13 Drawing Sheets

(51) Int. Cl.
  *H02K 15/04* (2006.01)
  *H02K 15/02* (2006.01)
  *H02K 15/00* (2006.01)
(52) U.S. Cl.
  CPC ....... *H02K 15/026* (2013.01); *H02K 15/0435* (2013.01); *H02K 15/06* (2013.01); *H02K 15/063* (2013.01); *Y10T 29/49009* (2015.01); *Y10T 29/49011* (2015.01)

(56) References Cited

U.S. PATENT DOCUMENTS

| | | | | |
|---|---|---|---|---|
| 6,903,479 | B2 * | 6/2005 | Kato | H02K 15/0037 310/201 |
| 6,960,857 | B2 * | 11/2005 | Oohashi | H02K 3/12 310/179 |
| 7,084,541 | B2 * | 8/2006 | Gorohata | H02K 3/505 310/180 |
| 7,382,069 | B2 * | 6/2008 | Kumakura | H02K 3/505 310/201 |
| 7,391,138 | B2 * | 6/2008 | Seguchi | H02K 3/28 310/180 |
| 7,439,645 | B2 * | 10/2008 | Gorohata | H02K 3/28 310/179 |
| 7,600,311 | B2 * | 10/2009 | Kreuzer | H02K 15/024 29/596 |
| 2002/0017825 | A1 | 2/2002 | Oohashi et al. | |
| 2002/0130582 | A1 * | 9/2002 | Oketani | H02K 3/345 310/216.004 |
| 2003/0015932 | A1 * | 1/2003 | Oohashi | H02K 15/0478 310/201 |
| 2004/0040142 | A1 * | 3/2004 | Hirota | H02K 3/12 29/596 |
| 2006/0230603 | A1 | 10/2006 | Hirota et al. | |
| 2008/0136284 | A1 * | 6/2008 | Fujii | H02K 3/12 310/214 |
| 2009/0102309 | A1 * | 4/2009 | Kamibayashi | H02K 1/165 310/195 |

FOREIGN PATENT DOCUMENTS

| | | |
|---|---|---|
| JP | 2003-219591 A | 7/2003 |
| JP | 2004-32882 A | 1/2004 |
| JP | 2004-32892 A | 1/2004 |
| JP | 2004-32898 A | 1/2004 |
| JP | 3621635 B2 | 2/2005 |
| JP | 2007-166751 A | 6/2007 |
| JP | 2008-148431 A | 6/2008 |
| JP | WO 2010055738 A1 * | 5/2010 |
| WO | 2005/074105 A1 | 8/2005 |

OTHER PUBLICATIONS

Communication dated Nov. 25, 2014 from the Japanese Patent Office in counterpart application No. 2014-005155.
Communication dated Jan. 26, 2015 from the State Intellectual Property Office of P.R. China in counterpart application No. 201080070668.3.
International Search Report for PCT/JP2010/072493 dated Feb. 8, 2011.
Communication dated Aug. 4, 2015 from the Japanese Patent Office in counterpart application No. 2014-005155.

* cited by examiner (a)

(b)

AUTOMOTIVE ROTARY ELECTRIC MACHINE AND STATOR MANUFACTURING METHOD THAT IS USED THEREFOR

CROSS REFERENCE TO RELATED APPLICATIONS

This application is a National Stage of International Application No. PCT/JP2010/072493 filed Dec. 14, 2010, the contents of which are incorporated herein by reference in their entirety.

TECHNICAL FIELD

The present invention relates to a rotary electric machine such as an automotive alternator, for example, and a stator manufacturing method that is used therefor, and particularly relates to a coil end construction of a stator winding.

BACKGROUND ART

Conventional automotive alternator stators are configured by mounting a stator winding into a stator core in which slots are formed at a ratio of two slots per phase per pole. The stator winding is constituted by three pairs of first wave winding groups and second wave winding groups, the first wave winding group being formed by arranging at a pitch of one slot six single-turn first windings that are configured by mounting wires in wave shapes so as to alternately occupy an inner layer and an outer layer in a slot depth direction inside the slots in every sixth slot, and the second wave winding groups being formed by arranging at a pitch of one slot six single-turn second windings that are configured by mounting wires in wave shapes so as to alternately occupy an inner layer and an outer layer in a slot depth direction inside the slots in every sixth slot so as to be inverted so as to be offset by 180 electrical degrees relative to the first windings, the first wave winding groups and second wave winding groups being disposed such that slot-housed portions of the first winding and slot-housed portions of the second winding alternate in a slot depth direction and line up in single columns inside the respective slots (see Patent Literature 1, for example).

CITATION LIST

Patent Literature

Patent Literature 1: Japanese Patent Laid-Open No. 2002-58189 (Gazette)

SUMMARY OF THE INVENTION

Problem to be Solved by the Invention

In conventional automotive alternators, winding assemblies that constitute the first and second wave winding groups are produced by bending twelve wires, and the winding assemblies are mounted into the slots of the stator core so as to be stacked in three layers in a slot depth direction. Because wires that have circular cross sections are used due to ease of bending, it has not been possible to increase conductor space factor of the conductor inside the slots. Thus, from the viewpoint of improving output, after producing the winding assemblies that constitute the first and second wave winding groups by bending wires that have circular cross sections, it has been necessary to increase space factor inside the slots by plastically deforming the slot-housed portions of the first and second windings that have circular cross sections into flat cross sections.

In recent years, as engine compartments become smaller, additional improvements in output are being sought due to increases in vehicle load, and it has been necessary to increase the cross-sectional area of the wires to achieve reductions in the resistance of the windings.

However, if the diameter of wire that has a circular cross section is increased, then return portions that have circular cross sections that link the slot-housed portions interfere with each other, and one problem has been that the winding assemblies cannot be mounted into the slots of the stator core so as to be stacked in three layers in the slot depth direction. Even if the winding assemblies can be mounted into the slots of the stator core so as to be stacked in three layers in the slot depth direction, bulges in the radial direction of coil end groups that are constituted by the return portions are increased, giving rise to problems such as interference with a housing or a rotor.

The present invention aims to solve the above problems and an object of the present invention is to provide an automotive rotary electric machine and a stator manufacturing method that is used therefor in which radial widths of return portions of winding assemblies that constitute coil ends of a stator winding that are stacked in three layers in a radial direction are made narrower sequentially in an intermediate layer, an inner layer, and an outer layer to enable mounting of winding assemblies that use wires that have large cross-sectional areas into a stator core, to suppress bulges in a radial direction of coil end groups, and to enable interference with a housing and a rotor to be avoided.

Means for Solving the Problem

In order to achieve the above object, according to one aspect of the present invention, there is provided an automotive rotary electric machine including a stator including: an annular stator core in which a plurality of slots that have openings on an inner circumferential side are disposed at a predetermined pitch circumferentially; and a stator winding that is constituted by a plurality of winding assemblies that are mounted into the stator core. The winding assemblies are configured by arranging wire pairs that are equal in number to a predetermined slot pitch so as to be offset from each other by a pitch of one slot, the wire pairs being formed by arranging two wires so as to be offset by a predetermined slot pitch from each other such that slot-housed portions are stacked, the wires being constituted by continuous wires that are formed into a pattern in which the slot-housed portions are linked by return portions and are arranged at the predetermined slot pitch, and adjacent slot-housed portions are offset by the return portions so as to alternately occupy an inner layer and an outer layer in a slot depth direction, and the slot-housed portions are plastically deformed so as to have a squared cross section. The stator winding is configured by mounting the winding assemblies into the stator core so as to be stacked in three or more layers in a radial direction such that the slot-housed portions line up in single columns in a slot depth direction inside the slots, and radial widths of the return portions of the winding assemblies that are mounted so as to be stacked in a radial direction are made sequentially narrower in order of return portions of a winding assembly that is positioned centrally, return portions of a winding assembly that is positioned on an inner circumferential side, and return portions of a winding assembly that is positioned on an outer circumferential side.

Effects of the Invention

According to the present invention, radial widths of the return portions of the winding assemblies that are disposed so as to be stacked in three or more layers in a radial direction are made sequentially narrower in order of the return portions of the winding assembly that is positioned centrally, the return portions of the winding assembly that is positioned on the inner circumferential side, and the return portions of the winding assembly that is positioned on the outer circumferential side. Thus, because bulges in the radial direction of the coil end groups are suppressed even if the winding assemblies are prepared using wires that have large cross-sectional areas, interference between the stator winding and a housing and between the stator winding and a rotor is avoided.

DESCRIPTION OF EMBODIMENTS

A preferred embodiment of an automotive rotary electric machine according to the present invention will now be explained with reference to the drawings.

Figure 1:
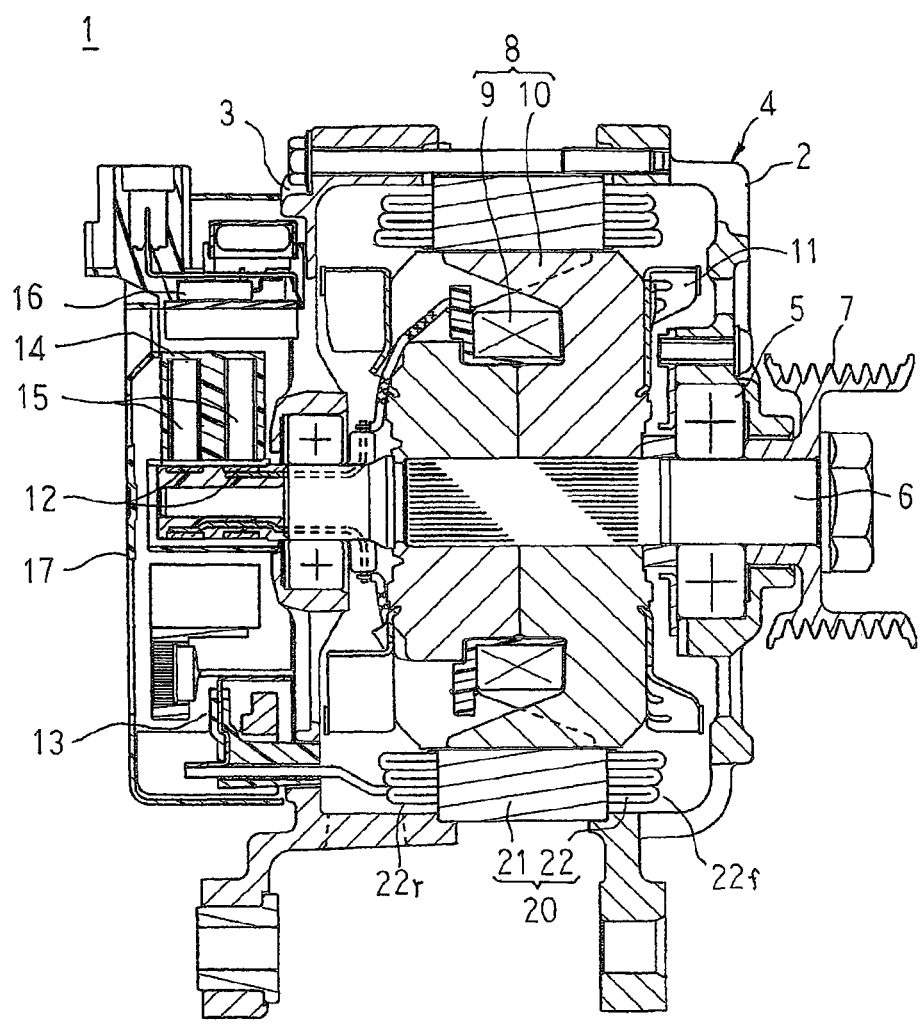
FIG. 1 is a cross section that explains a configuration of an automotive alternator according to a preferred embodiment of the present invention.
Figure 2:
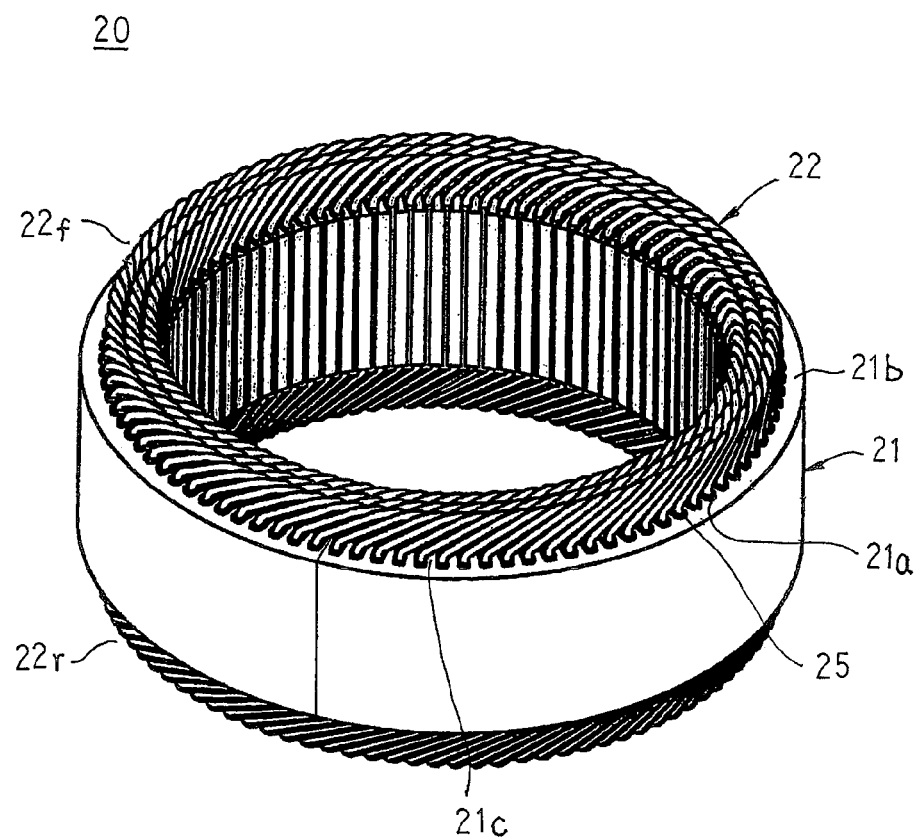
FIG. 2 is a perspective that shows a stator of the automotive alternator according to the preferred embodiment of the present invention.
Figure 3:
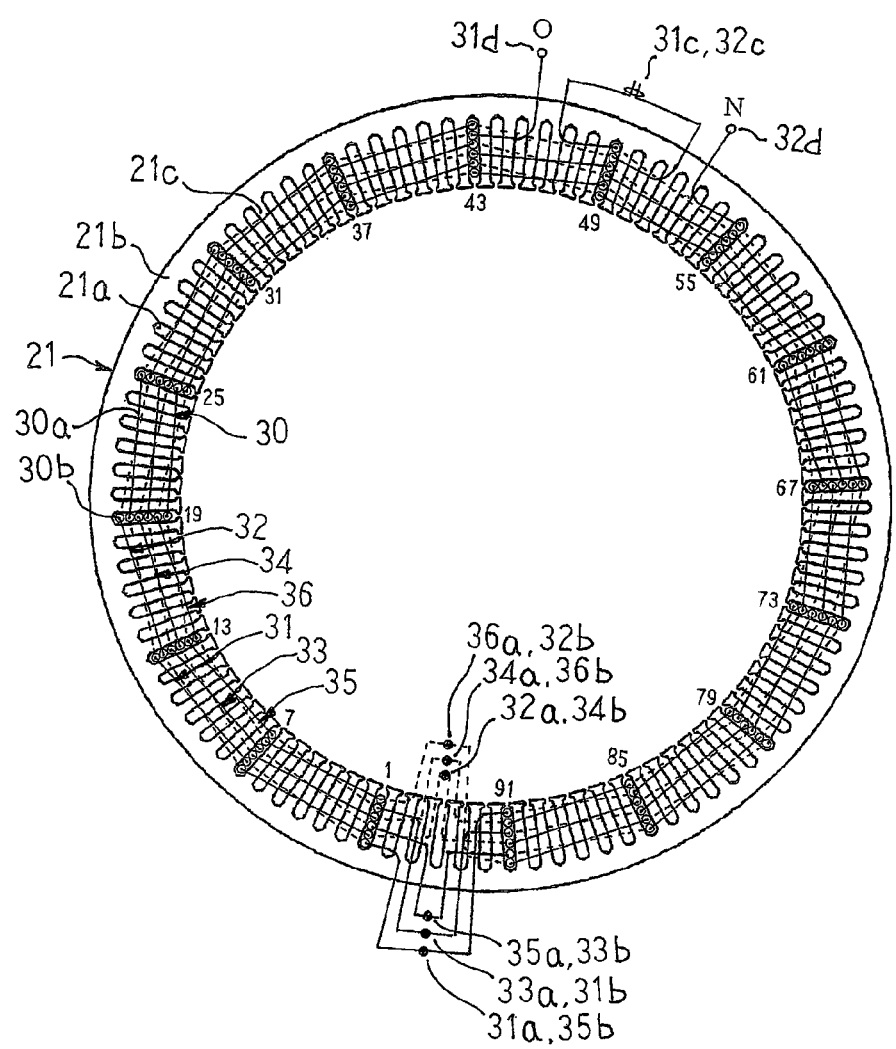
FIG. 3 is a rear-end end elevation that explains a connected state of a single phase portion of a stator winding in the automotive alternator according to the preferred embodiment of the present invention.
Figure 4:
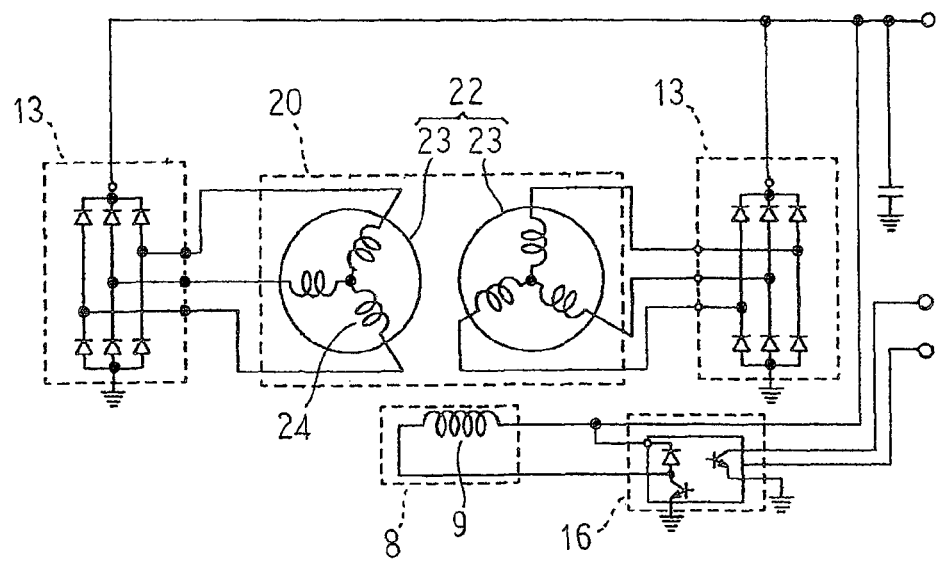
FIG. 4 is a circuit configuration diagram of the automotive alternator according to the preferred embodiment of the present invention.
Figure 5:
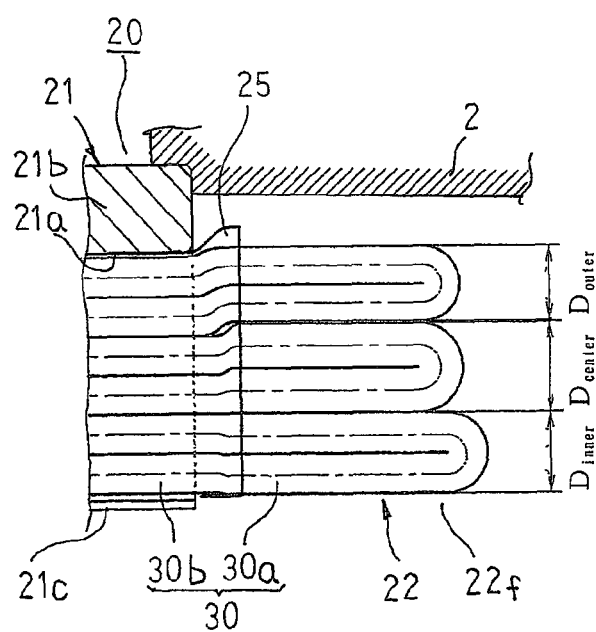
FIG. 5 is a partial cross section that shows the automotive alternator according to the preferred embodiment of the present invention.

FIG. 1 is a cross section that explains a configuration of an automotive alternator according to a preferred embodiment of the present invention, FIG. 2 is a perspective that shows a stator of the automotive alternator according to the preferred embodiment of the present invention, FIG. 3 is a rear-end end elevation that explains a connected state of a single phase portion of a stator winding in the automotive alternator according to the preferred embodiment of the present invention, FIG. 4 is a circuit configuration diagram of the automotive alternator according to the preferred embodiment of the present invention, and FIG. 5 is a partial cross section that shows the automotive alternator according to the preferred embodiment of the present invention.

Moreover, output wires are omitted in FIG. 2. In FIG. 3, solid lines represent rear-end wiring, and broken lines represent front-end wiring.

In FIG. 1, an automotive alternator 1 that functions as an automotive rotary electric machine includes: a housing 4 that is constituted by a front bracket 2 and a rear bracket 3 that are each approximately bowl-shaped and made of aluminum; a shaft 6 that is rotatably supported in the housing 4 by means of a pair of bearings 5; a pulley 7 that is fixed to an end portion of the shaft 6 that projects out frontward from the housing 4; a rotor 8 that is fixed to the shaft 6 and that is disposed inside the housing 4; a stator 20 that is fixed to the housing 4 so as to surround the rotor 8; a pair of slip rings 12 that are fixed to a portion of the shaft 6 that projects out rearward from the housing 4, and that supply electric current to the rotor 8; rectifying apparatuses 13 that are prepared so as to have an approximate C shape, that are disposed outside the slip rings 12 in a fan shape that is centered around the shaft 6 in a plane that is perpendicular to the shaft 6, and that rectify alternating-current voltages that are generated in the stator 20 into direct-current voltages; a pair of brushes 15 that are housed inside a brush holder 14 that is disposed outside the pair of slip rings 12 between tip ends of the approximate C shape of the rectifying apparatuses 13 so as to slide on the respective slip rings 12; a voltage regulator 16 that is mounted to the brush holder 14 and that adjusts magnitude of the alternating-current voltages that are generated in the stator 20; and a cover 17 that is mounted to the rear bracket 3 so as to cover the rectifying apparatuses 13, the brush holder 14, and the voltage regulator 16.

The rotor 8 is a Lundell rotor, and includes: a field winding 9 that generates magnetic flux on passage of an excitation current; and a pole core 10 that is disposed so as to cover the field winding 9, and in which magnetic poles are formed by the magnetic flux. Fans 11 are fixed to two axial end surfaces of the pole core 10 by welding, etc.

As shown in FIG. 2, the stator 20 includes: a cylindrical stator core 21 in which slots 21a that have openings on an inner circumferential side are arranged at a predetermined pitch in a circumferential direction; a stator winding 22 that is mounted into the stator core 21, and in which alternating currents arise due to changes in magnetic flux from the field winding 9 as the rotor 8 rotates; and insulators 25 that are mounted into each of the slots 21a to insulate the stator winding 22 and the stator core 21 electrically. As described below, the stator winding 22 includes a plurality of windings in which single wires 30 are wave wound and mounted so as to be turned over outside the slots 21a near end surfaces of the stator core 21, and alternately occupy an inner layer and an outer layer in a slot depth direction inside the slots 21a at a predetermined number of slots (a pitch of one magnetic pole).

In this case, ninety-six slots 21a are formed on the stator core 21 at a uniform angular pitch (a pitch of 30 electrical degrees) so as to correspond to the number of magnetic poles (16) in the rotor 8 and house two three-phase alternating current windings. In other words, the slots 21a are formed at a ratio of two slots per phase per pole.

The stator 20 that is configured in this manner is disposed such that two axial end surfaces of the stator core 21 are held between the front bracket 2 and the rear bracket 3 from two axial ends, and so as to surround the pole core 10 of the rotor 8 so as to ensure a uniform gap from the outer peripheral surface of the pole core 10.

Next, a winding construction of a single phase portion of the phase windings 24 will be explained in detail with reference to FIG. 3.

The stator core 21 is formed by laminating magnetic steel sheets that are formed so as to have predetermined shapes, has: an annular core back 21b; and teeth 21c that each project radially inward from an inner circumferential surface of the core back 21b, and that are arranged at a uniform angular pitch circumferentially, and the slots 21a, which have openings on an inner circumferential side, are defined by the core back 21b and circumferentially adjacent teeth 21c.

The phase winding 24 is constituted by first through sixth windings 31 through 36 that are each constituted by a single wire 30. The wires 30 are constituted by continuous wires that are made of copper that is coated with an insulator, for example.

The first winding 31 is configured by winding a single wire 30 into a wave winding in every sixth slot from Slot Numbers 1 through 91 so as to alternately occupy a first position from an outer circumferential side (hereinafter "Address 1") and a second position from the outer circumferential side (hereinafter "Address 2") inside the slots 21a. The second winding 32 is configured by winding a wire 30 into a wave winding in every sixth slot from Slot Numbers 1 through 91 so as to alternately occupy Address 2 and Address 1 inside the slots 21a. The third winding 33 is configured by winding a wire 30 into a wave winding in every sixth slot from Slot Numbers 1 through 91 so as to alternately occupy a third position from the outer circumferential side (hereinafter "Address 3") and a fourth position from the outer circumferential side (hereinafter "Address 4") inside the slots 21a. The fourth winding 34 is configured by winding a wire 30 into a wave winding in every sixth slot from Slot Numbers 1 through 91 so as to alternately occupy Address 4 and Address 3 inside the slots 21a. The fifth winding 35 is configured by winding a wire 30 into a wave winding in every sixth slot from Slot Numbers 1 through 91 so as to alternately occupy a fifth position from the outer circumferential side (hereinafter "Address 5") and a sixth position from the outer circumferential side (hereinafter "Address 6") inside the slots 21a. The sixth winding 36 is configured by winding a wire 30 into a wave winding in every sixth slot from Slot Numbers 1 through 91 so as to alternately occupy Address 6 and Address 5 inside the slots 21a.

At a first end of the stator core 21, an end portion 31a of the first winding 31 that projects outward from Slot Number 1 and an end portion 35b of the fifth winding 35 that projects outward from Slot Number 91 are joined together, an end portion 33a of the third winding 33 that projects outward from Slot Number 1 and an end portion 31b of the first winding 31 that projects outward from Slot Number 91 are joined together, and an end portion 35a of the fifth winding 35 that projects outward from Slot Number 1 and an end portion 33b of the third winding 33 that projects outward from Slot Number 91 are joined together to form a three-turn winding.

At a second end of the stator core 21, an end portion 32a of the second winding 32 that projects outward from Slot Number 1 and an end portion 34b of the fourth winding 34 that projects outward from Slot Number 91 are joined together, an end portion 34a of the fourth winding 34 that projects outward from Slot Number 1 and an end portion 36b of the sixth winding 36 that projects outward from Slot Number 91 are joined together, and an end portion 36a of the sixth winding 36 that projects outward from Slot Number 1 and an end portion 32b of the second winding 32 that projects outward from Slot Number 91 are joined together to form a three-turn winding.

In addition, a portion of the wire 30 of the first winding 31 that projects outward at the first end of the stator core 21 from Slot Numbers 43 and 49 is cut, and a portion of the wire 30 of the second winding 32 that projects outward at the first end of the stator core 21 from Slot Numbers 49 and 55 is cut. A cut end 31c of the first winding 31 and a cut end 32c of the second winding 32 are then joined together to form a six-turn phase winding 24 that is formed by connecting the first through sixth windings 31 through 36 in series. A cut end 31d of the first winding 31 and a cut end 32d of the second winding 32 respectively form an output wire (O) and a neutral point (N).

Six phase windings 24 are formed by offsetting slots 21a into which wires 30 are mounted in a similar or identical manner one at a time. As shown in FIG. 4, two three-phase alternating current windings 23 are each configured by wye-connecting three phase windings 24, and the respective three-phase alternating-current windings 23 are connected to the respective rectifying apparatuses 13. Direct-current (DC) output from the respective rectifying apparatuses 13 is connected in parallel and combined.

Now, return portions 30a of the wires 30 that project outward from the slots 21a near the end surface of the stator core 21 and are turned over form coil ends. The return portions 30a are in a state of surface contact with each other in a radial direction, and are arranged neatly circumferentially so as to form three rows in a radial direction to form coil end groups 22f and 22r at two ends of the stator core 21. As shown in FIG. 5, radial widths of the return portions 30a that are lined up in three rows in a radial direction are sequentially narrower in order of the radial width ($D_{center}$) of the return portions 30a that are positioned centrally, the radial width ($D_{inner}$) of the return portions 30a that are positioned on the inner circumferential side, and the radial width ($D_{outer}$) of the return portions 30a that are positioned on the outer circumferential side. The inner circumferential return portions 30a are positioned further outward in a radial direction than inner circumferential edges of the teeth 21c.

Slot-housed portions 30b are formed so as to have squared cross sections, and six are housed in each of the slots 21a so as to line up in single columns radially.

The respective wires 30 that constitute the first through sixth windings 31 through 36 are mounted into wave windings so as to extend outward at end surfaces of the stator core 21 from one slot 21a and be turned over to enter a slot 21a that is six slots away. The respective wires 30 are mounted so as to alternately occupy an inner layer and an outer layer in a slot depth direction (a radial direction) in every sixth slot. The second, fourth, and sixth windings 32, 34, and 36 are mounted so as to be offset by 180 electrical degrees and inverted relative to the first, third, and fifth windings 31, 33, and 35. Here, the stator winding 22 is equivalent to three pairs of first winding groups and second winding groups being arranged so as to line up in a radial direction, the first winding groups being configured by arranging six first windings 31 at a pitch of one slot, and the second winding groups being configured by arranging six second windings 32 at a pitch of one slot. These pairs of first winding groups and second winding groups are provided by a winding assembly 40 that is produced while forming twelve wires 30 into a wave shapes.

Next, construction of the winding assembly 40 will be explained.

Figure 6:
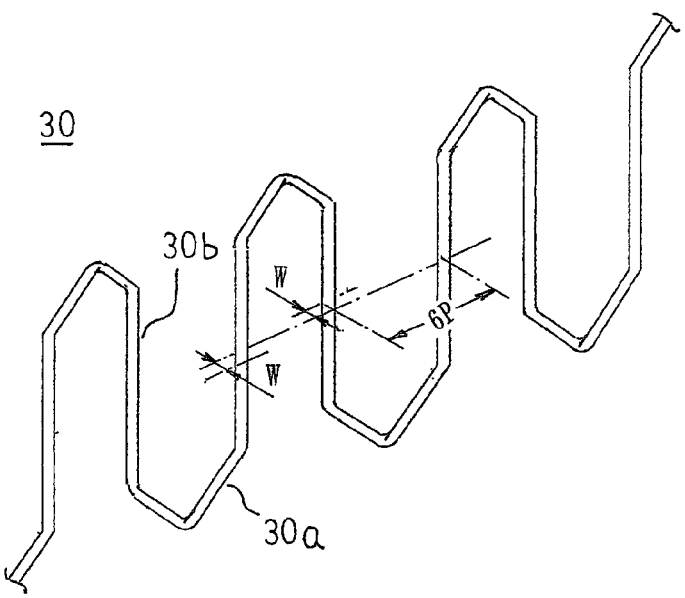
FIG. 6 is a perspective that shows a wire that constitutes a winding assembly that is used in the automotive alternator according to the preferred embodiment of the present invention.
Figure 7:
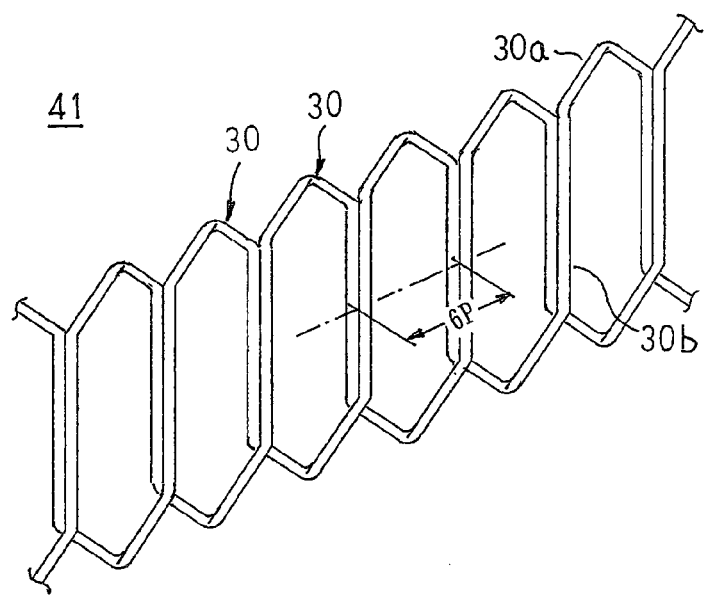
FIG. 7 is a perspective that shows a wire pair that constitutes a winding assembly that is used in the automotive alternator according to the preferred embodiment of the present invention.
Figure 8:
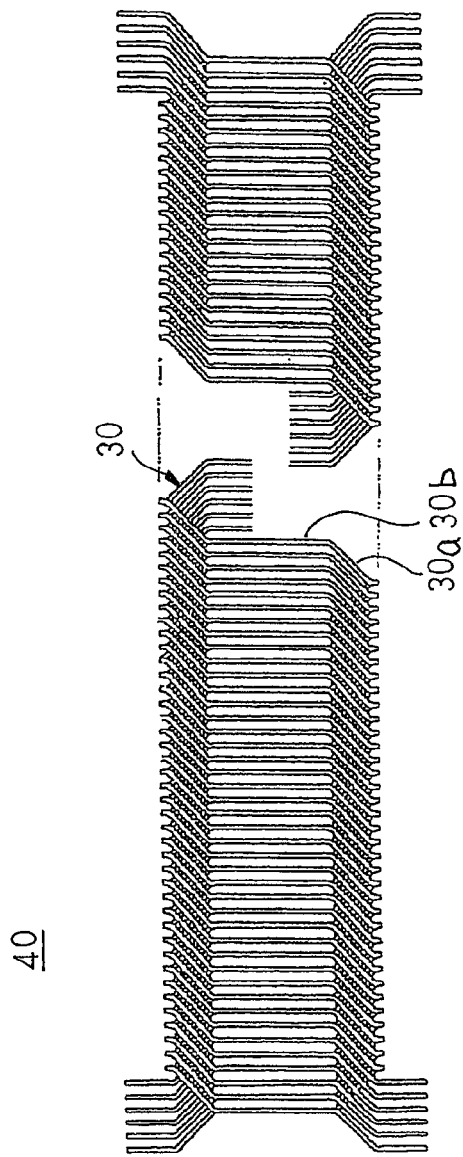
FIG. 8 is a plan that shows a winding assembly that constitutes the stator winding that is used in the automotive alternator according to the preferred embodiment of the present invention.

FIG. 6 is a perspective that shows a wire that constitutes a winding assembly that is used in the automotive alternator according to the preferred embodiment of the present invention, FIG. 7 is a perspective that shows a wire pair that constitutes a winding assembly that is used in the automotive alternator according to the preferred embodiment of the present invention, and FIG. 8 is a plan that shows a winding assembly that constitutes the stator winding that is used in the automotive alternator according to the preferred embodiment of the present invention.

As shown in FIG. 6, the wires 30 are formed by bending into planar patterns in which slot-housed portions 30b that are linked by return portions 30a and that are formed so as to have squared cross sections are arranged at a pitch of six slots (6P). Adjacent slot-housed portions 30b are alternately offset by the return portions 30a by a predetermined amount (W) in a direction (hereinafter called a "thickness direction" of the slot-housed portions 30b) that is perpendicular to two directions, i.e., a direction of arrangement of the slot-housed portions 30b and a longitudinal direction of the slot-housed portions 30b.

As shown in FIG. 7, wires 30 that are formed into such a pattern are arranged so as to be offset by a pitch of six slots such that the slot-housed portions 30b are stacked in the thickness direction to configure wire pairs 41. This wire pair 41 corresponds to a pair of first and second windings 31 and 32.

Six wire pairs 41 are arranged so as to be offset by a pitch of one slot to configure the winding assembly 40 that is shown in FIG. 8. Six end portions of the wires 30 each project outward on two sides at two ends of the winding assembly 40. The return portions 30a are arranged neatly in rows on two side portions of the winding assembly 40.

Winding assemblies 40 that are configured in this manner are mounted into the slots 21a of the stator core 21 so as to be stacked in three layers in a radial direction after a step of offsetting coil ends that is described below is performed, a step of compressing the coil ends that is described below is performed, and then the stator winding 22 is formed by connecting the end portions of each of the wires 30 based on the connection method that is shown in FIG. 3.

Next, operation of an automotive alternator 1 that has been configured in this manner will be explained.

First, electric current is supplied to the field winding 9 of the rotor 8 by means of the brushes 15 and the slip rings 12 to generate magnetic flux. North-seeking (N) poles and South-seeking (S) poles are formed alternately in a circumferential direction on outer circumferential portions of the pole core 10 by this magnetic flux.

At the same time, rotational torque from an engine (not shown) is transferred to the shaft 6 by means of a belt (not shown) and the pulley 7 to rotate the rotor 8. Thus, rotating magnetic fields are applied to the stator winding 22 in the stator 20, generating electromotive forces in the stator winding 22. These alternating-current electromotive forces are rectified into direct current by the rectifying apparatuses 13, and supplied to on-board loads, and to a battery, etc. The on-board loads are thereby driven, and the battery is charged.

According to the present invention, because the slot-housed portions 30b of the wires 30 are formed so as to have squared cross sections, and six slot-housed portions 30b are housed in each of the slots 21a so as to line up in single columns radially, electric conductor space factor is increased, enabling improvements in output from the automotive alternator 1 to be achieved.

In the coil end groups 22f and 22r of the stator winding 22, because the radial widths of the return portions 30a that are lined up in three rows in a radial direction are sequentially narrower in order of the return portions 30a that are positioned centrally, the return portions 30a that are positioned on the inner circumferential side, and the return portions 30a that are positioned on the outer circumferential side, radial bulges in the coil end groups 22f and 22r can be suppressed. Thus, interference between the coil end groups 22*f* and 22*r* and the housing 4, and interference between the coil end groups 22*f* and 22*r* and the rotor 8 can be suppressed.

Because the inner circumferential return portions 30*a* are positioned further outward in a radial direction than the inner circumferential edges of the teeth 21*c*, interference between the coil end groups 22*f* and 22*r* and the rotor 8 can be reliably prevented.

Because the return portions 30*a* that are lined up in three rows in a radial direction are in surface contact with each other, thermal conductivity among the return portions 30*a* that are lined up in a radial direction is increased. Thus, because heat that is generated in the wires 30 that constitute the winding assembly 40 that are positioned on the outer circumferential side is transferred to the inner circumferential side through the return portions 30*a* that are lined up in a radial direction, and is radiated from the inner circumferential return portions 30*a* to a cooling airflow that is formed by the fans 11, excessive temperature increases in the stator winding 22 can be suppressed. In addition, the temperature of the return portions 30*a* that are lined up in three rows in a radial direction is averaged, eliminating temperature irregularities, and improving electric power generating efficiency.

Because the return portions 30*a* on the inner circumferential side are deformed in the step of compressing the coil ends so as to have narrower radial widths, axial length is increased. Thus, because the area of the inner circumferential return portions 30*a* that is exposed to a cooling airflow that has been deflected centrifugally by the fans 11 is increased, increasing heat radiating effects, temperature increases in the stator winding 22 are further suppressed.

A manufacturing method for the stator 20 will now be explained.

Figure 9:
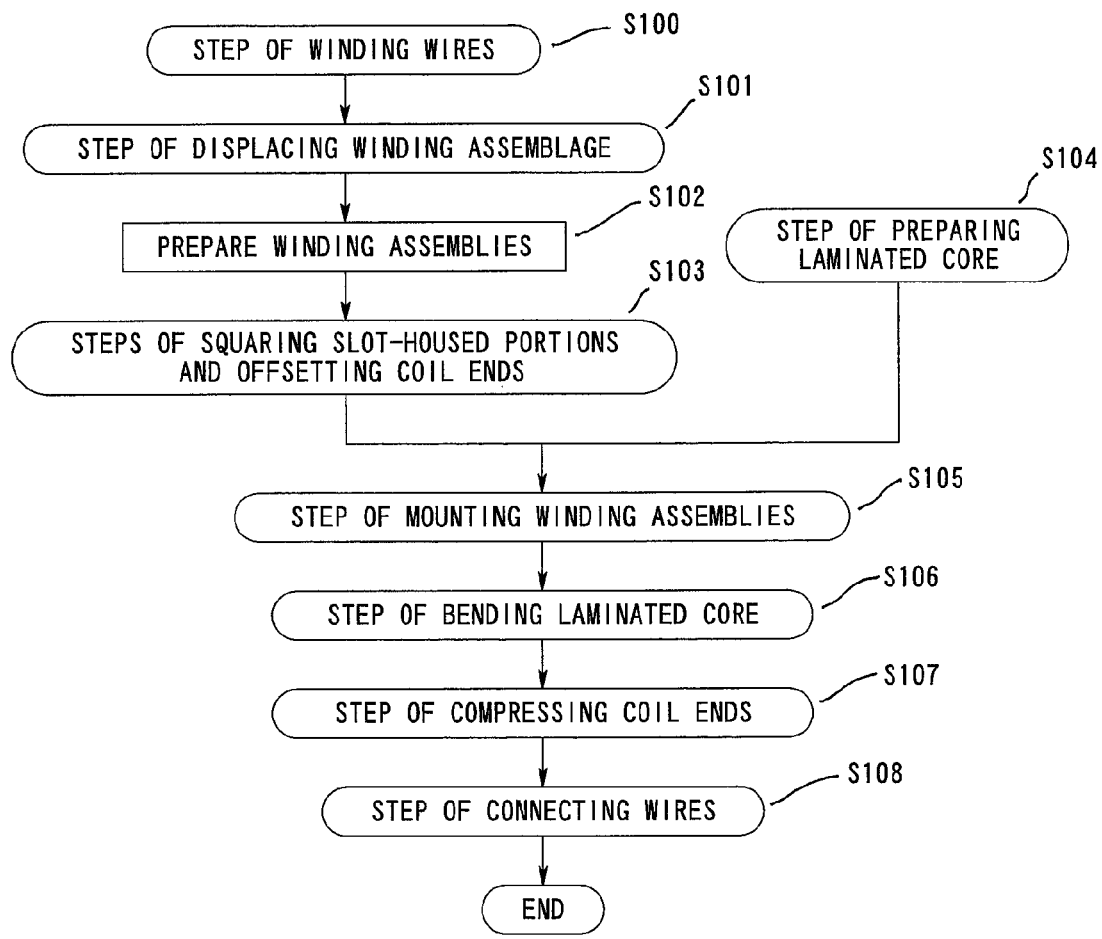
FIG. 9 is a process diagram that explains a manufacturing method for the stator that is used in the automotive alternator according to the preferred embodiment of the present invention.
Figure 10:
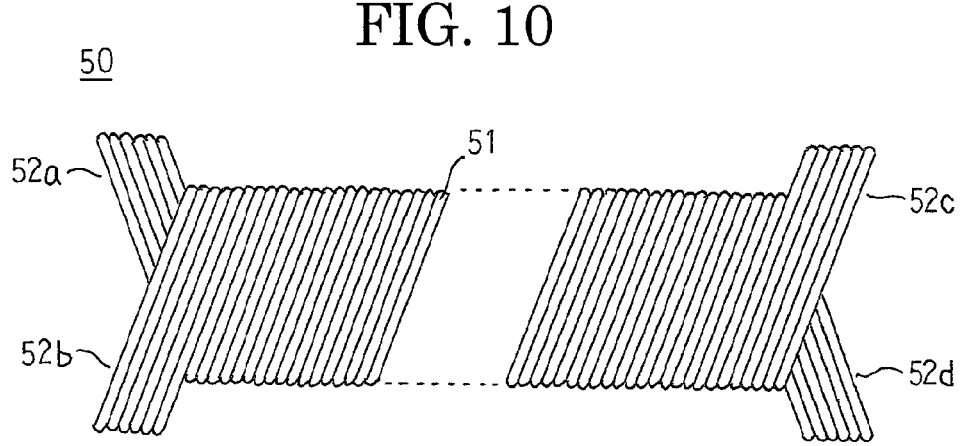
FIG. 10 is a plan that shows a winding assemblage that is produced by a step of winding wires in the manufacturing method for the stator that is used in the automotive alternator according to the preferred embodiment of the present invention.
Figure 11:
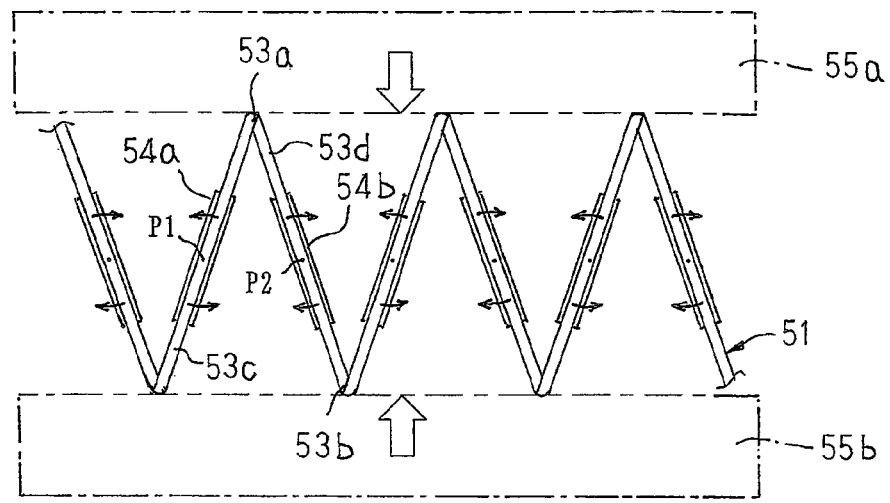
FIG. 11 is a diagram that explains a step of displacing the winding assemblage in the manufacturing method for the stator that is used in the automotive alternator according to the preferred embodiment of the present invention.
Figure 12:
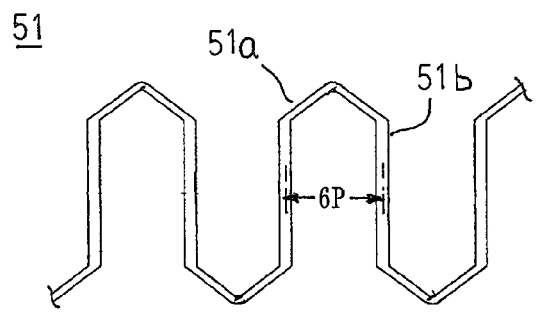
FIG. 12 is a plan that shows the wire that constitutes the winding assembly that is produced by the step of displacing the winding assemblage in the manufacturing method for the stator that is used in the automotive alternator according to the preferred embodiment of the present invention.
Figure 13:
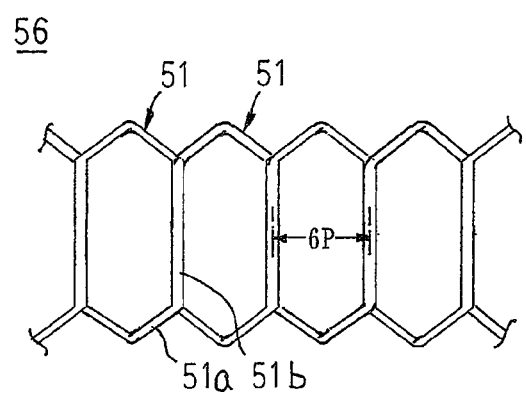
FIG. 13 is a plan that shows the wire pair that constitutes the winding assembly that is produced by the step of displacing the winding assemblage in the manufacturing method for the stator that is used in the automotive alternator according to the preferred embodiment of the present invention.
Figure 14:
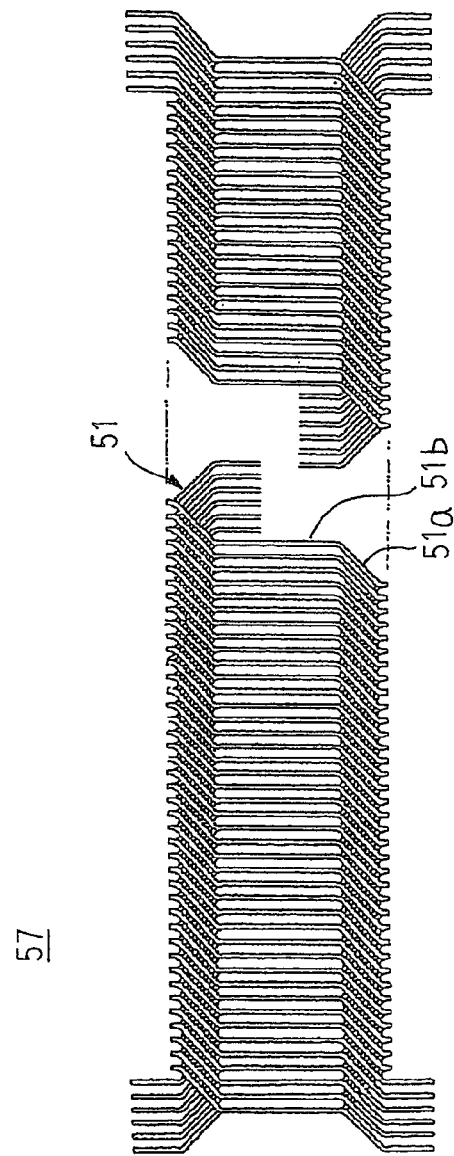
FIG. 14 is a plan that shows the winding assembly that is produced by the step of displacing the winding assemblage in the manufacturing method for the stator that is used in the automotive alternator according to the preferred embodiment of the present invention.

FIG. 9 is a process diagram that explains a manufacturing method for the stator that is used in the automotive alternator according to the preferred embodiment of the present invention, FIG. 10 is a plan that shows a winding assemblage that is produced by a step of winding wires in the manufacturing method for the stator that is used in the automotive alternator according to the preferred embodiment of the present invention, FIG. 11 is a diagram that explains a step of displacing the winding assemblage in the manufacturing method for the stator that is used in the automotive alternator according to the preferred embodiment of the present invention, FIG. 12 is a plan that shows the wire that constitutes the winding assembly that is produced by the step of displacing the winding assemblage in the manufacturing method for the stator that is used in the automotive alternator according to the preferred embodiment of the present invention, FIG. 13 is a plan that shows the wire pair that constitutes the winding assembly that is produced by the step of displacing the winding assemblage in the manufacturing method for the stator that is used in the automotive alternator according to the preferred embodiment of the present invention, and FIG. 14 is a plan that shows the winding assembly that is produced by the step of displacing the winding assemblage in the manufacturing method for the stator that is used in the automotive alternator according to the preferred embodiment of the present invention.

A stator manufacturing method will now be explained based on the process diagram that is shown in FIG. 9.

First, a winding assemblage 50 that is shown in FIG. 10 is prepared by a wire winding step S100 that is explained in FIGS. 23 and 25 of International Publication No. WO/2005/074105 (Pamphlet), for example. That is, the winding assemblage 50 is prepared by forming outlet end portions 52*a* and 52*b* on twelve wires 51, winding the twelve wires 51 repeatedly a plurality of times simultaneously, and subsequently forming outlet end portions 52*c* and 52*d*. Continuous copper wire that has a circular cross section that is coated with an insulator is used in the wires 51 so as to allow for ease of bending.

As shown in FIG. 11, each of the wires 51 of the winding assemblage 50 has a plurality of first bent portions 53*a*, a plurality of second bent portions 53*b*, a plurality of first rectilinear portions 53*c*, and a plurality of second rectilinear portions 53*d*. In FIG. 11, the first bent portions 53*a* and the second bent portions 53*b* are distributed top and bottom, and are arranged at a uniform pitch so as to be offset by a half pitch from each other. The first rectilinear portions 53*c* extend obliquely from the second bent portions 53*b* toward the first bent portions 53*a* and link them, and the second rectilinear portions 53*d* extend obliquely from the first bent portions 53*a* toward the second bent portions 53*b* and link them. The wires 51 are wound so as to repeat unit loops that pass from the second bent portions 53*b* through the first rectilinear portions 53*c* to the first bent portions 53*a*, and then pass from the first bent portions 53*a* through the second rectilinear portions 53*d* to the second bent portions 53*b*. Moreover, in FIG. 11, only a single wire 51 is shown, but in fact, twelve wires 51 that have identical shapes are wound parallel to each other, as shown in FIG. 10.

Next, a step of displacing the winding assemblage 50 will be explained.

As shown in FIG. 11, in the step S101 of displacing the winding assemblage 50, first and second blades 54*a* and 54*b* are disposed so as to grip each of the first and second rectilinear portions 53*c* and 53*d*, and first and second restricting members 55*a* and 55*b* are disposed so as to come into contact with the first and second bent portions 53*a* and 53*b*.

Next, the first blades 54*a* that grip the first rectilinear portions 53*c* pivot counterclockwise around longitudinal center points of the first rectilinear portions 53*c* as pivoting centers P1, and the second blades 54*b* that grip the second rectilinear portions 53*d* pivot clockwise around longitudinal center points of the second rectilinear portions 53*d* as pivoting centers P2. Regions of the first and second rectilinear portions 53*c* and 53*d* that are gripped by the first and second blades 54*a* and 54*b* are displaced by this pivoting of the first and second blades 54*a* and 54*b* so as to be perpendicular to line segments that connect the pivoting centers P1 and P2. The first and second restricting members 55*a* and 55*b* are driven synchronously with this pivoting operation of the first and second blades 54*a* and 54*b* so as to narrow spacing while maintaining attitude parallel to the line segments that connect the pivoting centers P1 and P2.

Each of the wires 51 is thereby formed by bending into a planar pattern in which slot-housed portions 51*b* that are linked by return portions 51*a* are arranged at a pitch of six slots (6P), as shown in FIG. 12. Adjacent slot-housed portions 51*b* are offset by the return portions 51*a* by a thickness (W) of the wires 51. Two wires 51 that are formed by bending in this manner are aligned so as to be offset by a pitch of six slots by stacking the slot-housed portions 51*b* to constitute a wire pair 56 that is shown in FIG. 13. This wire pair 56 is constituted in an identical manner to that of the wire pair 41 that is shown in FIG. 7 except that the slot-housed portions 51*b* have circular cross sections.

In the step of displacing the winding assemblage 50, all of the first and second rectilinear portions 53*c* and 53*d* are displaced simultaneously to form the winding assembly 57 that is shown in FIG. 14 (S102). This winding assembly 57 is configured by arranging six of these wire pairs 56 so as to be successively offset by a pitch of one slot. Ninety-six stacked pairs of slot-housed portions 51b are arranged at a pitch of one slot. The return portions 51a of the wires 51 are arranged neatly in rows on two side portions of the winding assembly 57, and six end portions of the wires 51 (corresponding to the outlet end portions 52a through 52d) each project outward on two sides at two ends of the winding assembly 57. Moreover, this winding assembly 57 is constituted in an identical manner to that of the winding assembly 40 that is shown in FIG. 8 except that the slot-housed portions 51b have circular cross sections.

Next, steps of squaring the slot-housed portions 51b of the winding assembly 57 and offsetting the coil ends will be explained.

Figure 15:
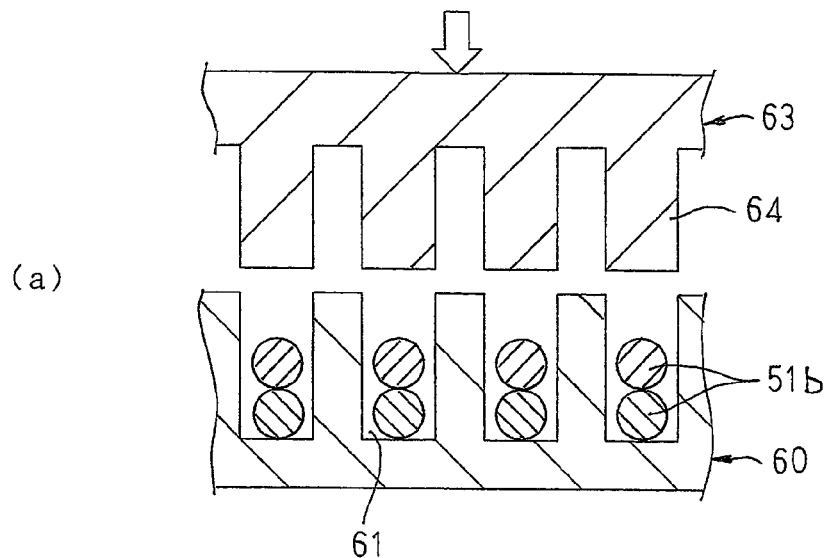
FIG. 15 is a diagram that explains a step of squaring slot-housed portions in the manufacturing method for the stator that is used in the automotive alternator according to the preferred embodiment of the present invention.
Figure 15:
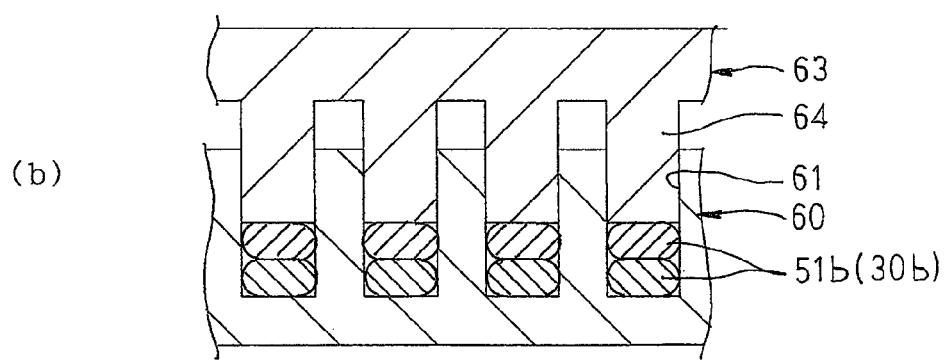
Figure 16:
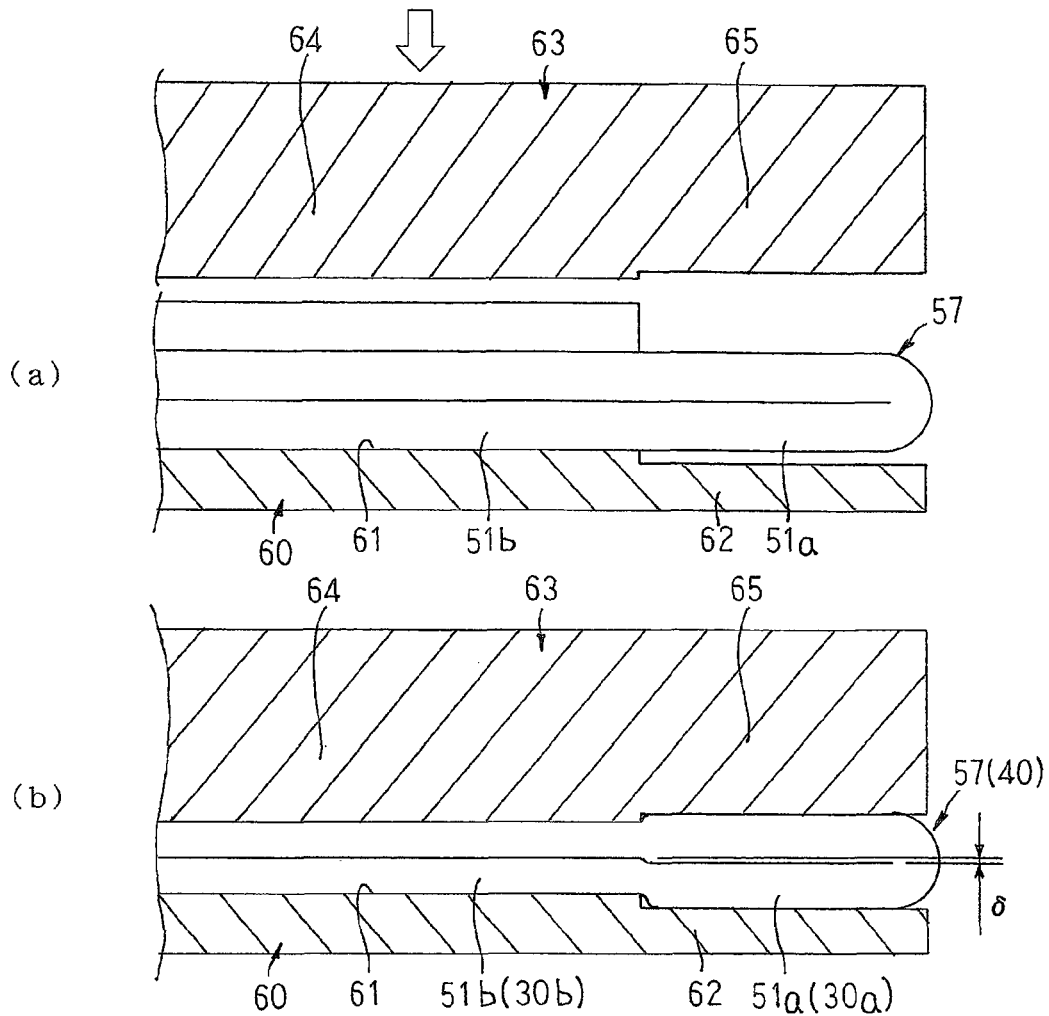
FIG. 16 is a diagram that explains a step of offsetting coil ends in the manufacturing method for the stator that is used in the automotive alternator according to the preferred embodiment of the present invention.
Figure 17:
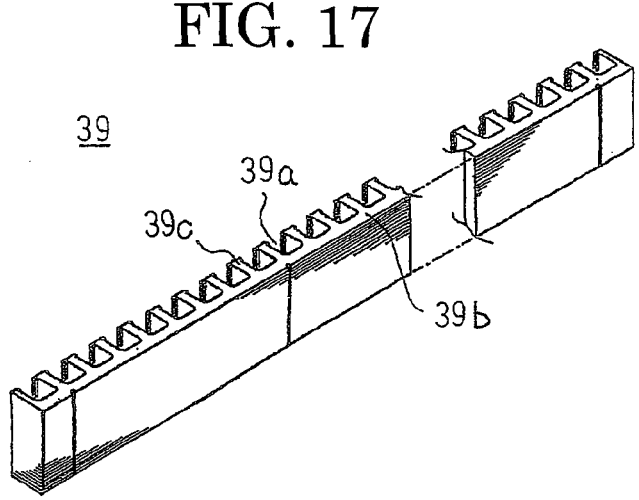
FIG. 17 is a perspective that shows a laminated core in the manufacturing method for the stator that is used in the automotive alternator according to the preferred embodiment of the present invention.
Figure 18:
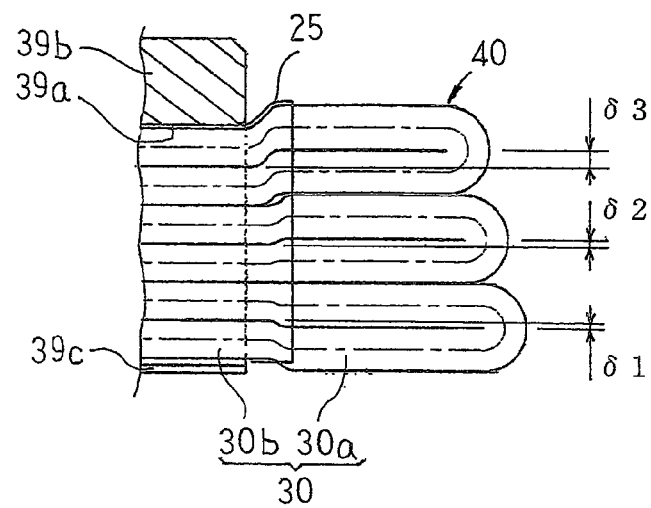
FIG. 18 is a partial cross section that explains a step of mounting the winding assembly in the manufacturing method for the stator that is used in the automotive alternator according to the preferred embodiment of the present invention.
Figure 19:
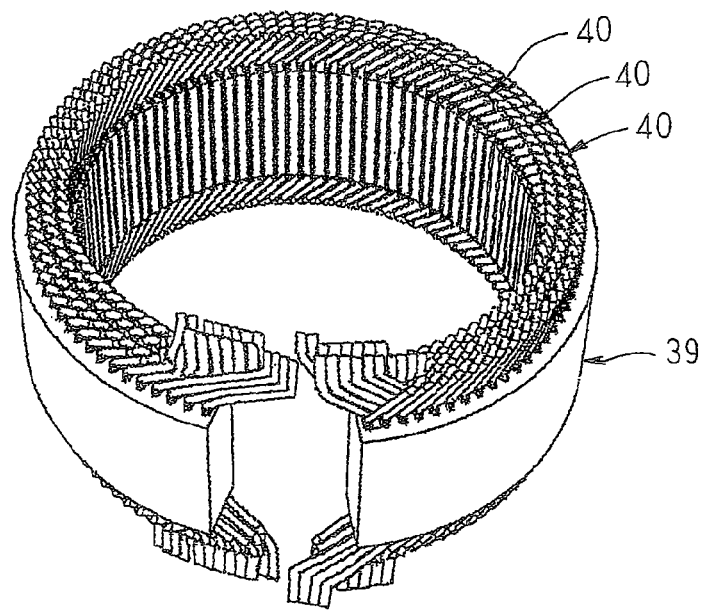
FIG. 19 is a perspective that explains a step of bending the laminated core in the manufacturing method for the stator that is used in the automotive alternator according to the preferred embodiment of the present invention.
Figure 20:
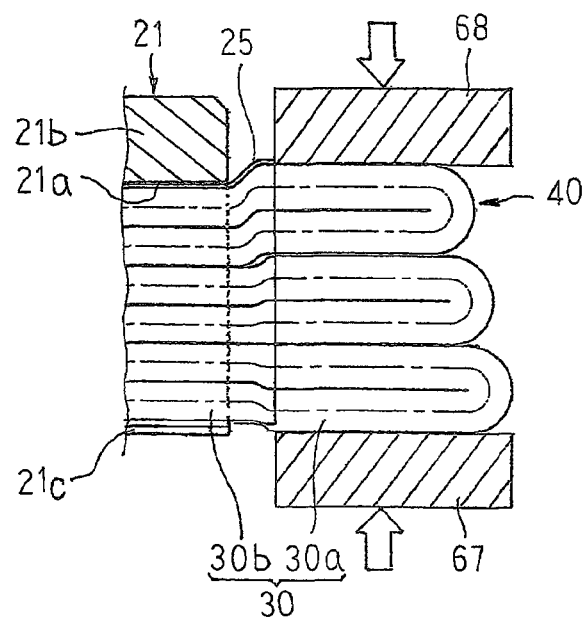
FIG. 20 is a partial cross section that explains a step of compressing the coil ends in the manufacturing method for the stator that is used in the automotive alternator according to the preferred embodiment of the present invention.
Figure 21:
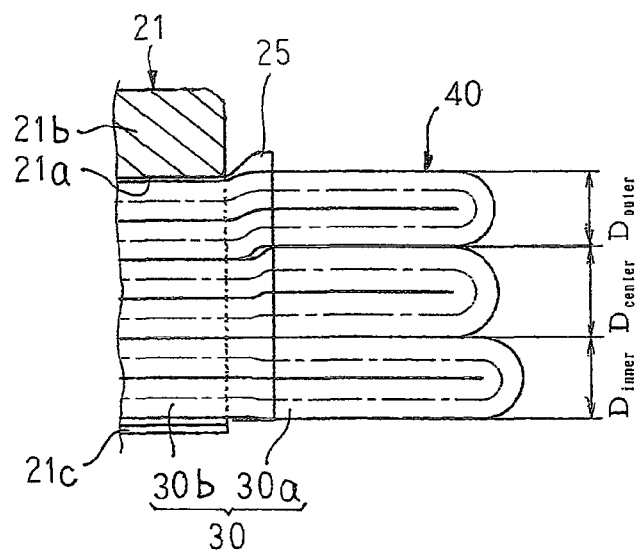
FIG. 21 is a partial cross section that that shows a state after the step of compressing the coil ends in the manufacturing method for the stator that is used in the automotive alternator according to the preferred embodiment of the present invention.

FIG. 15 is diagram that explains a step of squaring slot-housed portions in the manufacturing method for the stator that is used in the automotive alternator according to the preferred embodiment of the present invention, FIG. 15(a) showing a state before squaring, and FIG. 15(b) showing a state after squaring. FIG. 16 is a diagram that explains a step of offsetting coil ends in the manufacturing method for the stator that is used in the automotive alternator according to the preferred embodiment of the present invention, FIG. 16(a) showing a state before offsetting of the coil ends, and FIG. 16(b) showing a state after offsetting of the coil ends. FIG. 17 is a perspective that shows a laminated core in the manufacturing method for the stator that is used in the automotive alternator according to the preferred embodiment of the present invention, FIG. 18 is a partial cross section that explains a step of mounting the winding assembly in the manufacturing method for the stator that is used in the automotive alternator according to the preferred embodiment of the present invention, FIG. 19 is a perspective that explains a step of bending the laminated core in the manufacturing method for the stator that is used in the automotive alternator according to the preferred embodiment of the present invention, FIG. 20 is a partial cross section that explains a step of compressing the coil ends in the manufacturing method for the stator that is used in the automotive alternator according to the preferred embodiment of the present invention, and FIG. 21 is a partial cross section that that shows a state after the step of compressing the coil ends in the manufacturing method for the stator that is used in the automotive alternator according to the preferred embodiment of the present invention.

The step of squaring the slot-housed portions and the step of offsetting the coil ends are performed simultaneously in S103. As shown in FIGS. 15 and 16, a lower die 60 has: recess portions 61 that are disposed at a pitch of one slot, and into which slot-housed portions 51b of the winding assembly 57 are inserted; and a bearing plate 62 that extends in a direction of arrangement of the recess portions 61 on two outer sides in a groove direction of the recess portions 61, and that prescribes an amount of offset $\delta$ of the return portions 51a of the winding assembly 57. An upper die 63 has: salient portions 64 that are inserted into each of the recess portions 61, and that prescribe an amount of compression of the slot-housed portions 51b; and a pressing plate 65 that presses the return portions 51a of the winding assembly 57 onto the bearing plate 62.

As shown in FIGS. 15(a) and 16(a), in the step of squaring the slot-housed portions and offsetting the coil ends S103, the winding assembly 57 is set in the lower die 60 by inserting a pair of the slot-housed portions 51b into each of the recess portions 61 of the lower die 60. Next, the salient portions 64 are disposed so as to face each of the recess portions 61, and the upper die 63 on which the pressing plate 65 is disposed so as to face the bearing plate 62 is lowered.

As shown in FIG. 15(b), the slot-housed portions 51b that have circular cross sections are thereby compressed by the lower die 60 and the upper die 63, and are deformed plastically so as to have squared cross sections. Here, the plastically deformed squared cross sections are racetrack-shaped cross sections in which two ends of two parallel straight lines are linked by curved lines.

As shown in FIG. 16(b), a group of return portions 51a that are arranged neatly in rows on two side portions of the winding assembly 57 are pressed onto the bearing plate 62 by the pressing plate 65. The return portions 51a are thereby offset in the thickness direction by $\delta$ relative to the slot-housed portions 51b.

Here, three winding assemblies 57 that have amounts of offset $\delta1$, $\delta2$, and $\delta3$ are respectively formed using dedicated lower dies 60 and upper dies 63. The amounts of offset $\delta1$ and $\delta2$ of two winding assemblies 57 are similar or identical, but their directions of offset are in opposite directions. The amounts of offset $\delta1$ and $\delta2$ are set such that the slot-housed portions 51b and the return portions 51a almost contact each other when the two winding assemblies 57 are stacked. The direction of offset of the winding assembly 57 in which the amount of offset is $\delta3$ is an identical direction to the direction of offset of the winding assembly 57 in which the amount of offset is $\delta2$. The amount of offset $\delta3$ is set such that the slot-housed portions 51b and the return portions 51a almost contact each other when the winding assemblies 57 in which the amounts of offset are $\delta2$ and $\delta3$ are stacked. Specifically, the amount of offset $\delta3$ is set to approximately twice the amount of offset $\delta2$.

Moreover, in S103, the step of squaring the slot-housed portions and the step of offsetting the coil ends are performed simultaneously, but the step of offsetting the coil ends may also be performed after the step of squaring the slot-housed portions. The upper die 63 may also be configured so as to be divided into salient portions 64 and a pressing plate 65.

Because the slot-housed portions 51b that have circular cross sections are plastically deformed so as to have squared cross sections by this step of squaring the slot-housed portions and offsetting the coil ends S103, the wires 51 and the winding assemblies 57 that are formed by the wires 51 respectively have identical constructions to those of the wires 30 and the winding assemblies 40, and because of that will hereafter be explained as the wires 30 and the winding assemblies 40.

In a step S104 for preparing a laminated core 39, a rectangular parallelepiped laminated core 39 is prepared by laminating and integrating core segments that are punched from magnetic steel sheets. As shown in FIG. 17, in the laminated core 39, teeth 39c are formed so as to be arranged at a uniform pitch on a first side of a core back 39b, and slots 39a are defined by the core back 39b and adjacent teeth 39c.

Next, in a step S105 of mounting the winding assemblies 40, the winding assembly 40 in which the amount of offset is $\delta3$ is first mounted into the laminated core 39 such that the direction of offset is oriented toward the core back 39b. Next, the winding assembly 40 in which the amount of offset is $\delta2$ is mounted into the laminated core 39 such that the direction of offset is oriented toward the core back 39b. In addition, the winding assembly 40 in which the amount of offset is $\delta1$ is mounted into the laminated core 39 such that the direction of offset is oriented toward the openings of the slots 39a. As shown in FIG. 18, six slot-housed portions 30b are thereby housed inside the slots 39a so as to have thickness directions oriented in the slot depth direction and to line up in single columns. In addition, the return portions 30a are disposed so as to line up in three layers in the slot depth direction in close proximity to each other.

Next, in a step S106 of bending the laminated core 39, the laminated core 39 into which the winding assemblies 40 have been mounted is rounded into an annular shape, as shown in FIG. 19. End surfaces of the rounded laminated core 39 are then abutted to each other, and are integrated by welding, etc., to prepare the annular stator core 21.

Next, in a step S107 of compressing the coil ends, the stator core 21 is fixed, an inner pressure plate 67 is placed against the group of return portions 30a that are lined up in three layers in a radial direction from an inner circumferential side, and an outer pressure plate 68 is placed thereon from an outer circumferential side, as shown in FIG. 20. The inner pressure plate 67 is then moved by a predetermined distance outward in a radial direction, and the outer pressure plate 68 is moved by a predetermined distance inward in a radial direction. Here, because the amount of offset $\delta3$ of the return portions 30a that are positioned on the outer circumferential side is greater than the amount of offset $\delta1$ of the return portions 30a that are positioned on the inner circumferential side, the amount of movement (the compression rate) of the outer pressure plate 68 is adjusted so as to be greater than the amount of movement (the compression rate) of the inner pressure plate 67. The return portions 30a that are positioned on the outer circumferential side and the inner circumferential side are thereby held under pressure between the outer pressure plate 68 and the inner pressure plate 67, and are compressed and plastically deformed parallel to the outer circumferential surface of the return portions 30a that are positioned centrally. At the same time, because the return portions 30a that are positioned centrally are held between the return portions 30a that are positioned on the outer circumferential side and the inner circumferential side, the approximately circular cross sections are maintained.

Thus, as shown in FIG. 21, the radial widths of the return portions 30a that are positioned on the inner circumferential side, centrally, and on the outer circumferential side after the step S107 of compressing the coil ends are such that $D_{center} > D_{inner} > D_{outer}$. The return portions 30a that are positioned on the inner circumferential and the outer circumferential side are compressed and plastically deformed so as to be in a state of surface contact with the return portions 30a that are positioned centrally. The return portions 30a that are positioned on the inner circumferential side are displaced closer to an outer circumferential side than the inner circumferential edges of the teeth 21c by an amount that corresponds to the compression rate.

Next, in a step S108 of connecting the windings, the stator winding 22 is formed by connecting the end portions of each of the wires 30 based on the connection method that is shown in FIG. 3 to prepare the stator 20.

In the present invention, in a state in which winding assemblies 40 are mounted into a stator core 21 so as to be stacked in three layers in a radial direction, groups of return portions 30a that are stacked in three layers in a radial direction are compressed from a radially inner side and a radially outer side by a step S107 of compressing the coil ends. Thus, the return portions 30a are deformed plastically to place the return portions 30a that are stacked in three layers in a radial direction in a state of surface contact with each other. Because heat that is generated in the wires 30 of the winding assembly 40 that is positioned on the outer circumferential side is thereby transferred efficiently from the return portions 30a that are positioned on the outer circumferential side through the return portions 30a that are positioned centrally to the return portions 30a that are positioned on the inner circumferential side, the temperature of the return portions 30a that are lined up in three rows in a radial direction is averaged, eliminating temperature irregularities, and improving electric power generating efficiency. In addition, because heat that is transferred to the return portions 30a that are positioned on the inner circumferential side is radiated from the return portions 30a that are positioned on the inner circumferential side to the cooling airflow from the fans 11, excessive temperature increases in the stator winding 22 are suppressed.

Because groups of the return portions 30a of the winding assemblies 40 that are positioned on the outer circumferential side, which bulge the most in a step S106 of bending the laminated core 39, are compressed the most in the step S107 of compressing the coil ends, layers of air inside the coil end groups 22f and 22r are reduced. Thus, cooling efficiency of the coil end groups 22f and 22r is improved.

Because the return portions 30a of the inner circumferential winding assembly 40 that receives heat from the rotor 8 are compressed by the return portions 30a of the winding assembly 40 that is positioned centrally, area of the return portions 30a that extend axially, and that are exposed to the cooling airflow from the fans 11 is increased, suppressing temperature increases in the stator winding 22 that result from heat received from the rotor 8.

In the step of compressing the coil ends, because the radial widths of the return portions 30a which are lined up in three layers in a radial direction are made sequentially narrower in order of the return portions 30a that are positioned centrally, the return portions 30a that are positioned on the inner circumferential side, and the return portions 30a that are positioned on the outer circumferential side, bulges in the radial direction of the coil end groups 22f and 22r are suppressed, suppressing interference between the stator winding 22 and the rotor 8 and interference between the stator winding 22 and the housing 4. Because the return portions 30a that are positioned on the inner circumferential side are positioned closer to an outer circumferential side than the inner circumferential edges of the teeth 21c, interference between the stator winding 22 and the rotor 8 is prevented.

Before the step of mounting the winding assemblies 40, a step of offsetting the coil ends is performed to offset the return portions 30a of the winding assembly 40 that is positioned on the inner circumferential side toward the inner circumferential side, to offset the return portions 30a of the winding assembly 40 that is positioned centrally toward the outer circumferential side, and to offset the return portions 30a of the winding assembly 40 that is positioned on the outer circumferential side toward the outer circumferential side. Thus, in the step of mounting the winding assemblies 40, even if the cross-sectional area of the wires 30 is increased, interference among the return portions 30a is suppressed, facilitating mounting of the winding assemblies 40 into the stator core 21.

In the step of offsetting the coil ends, the amounts of offset of the return portions 30a of the winding assemblies 40 that are positioned on the inner circumferential side, centrally, and on the outer circumferential side are adjusted such that radially adjacent slot-housed portion 30b contact, or are in close proximity. Thus, even if the cross-sectional area of the wires 30 is increased, the return portions 30a do not interfere with each other, enabling the slot-housed portions 30b to be housed in the slots 21a so as to line up in single columns in a radial direction, thereby enabling the winding assemblies 40 to be mounted into the stator core 21 so as to be stacked in three layers in a radial direction.

In the step of offsetting the coil ends, the amounts of offset of the return portions 30a of the winding assemblies 40 that are positioned on the inner circumferential side and centrally are each adjusted such that the slot-housed portions 30b and the return portions 30a almost contact each other. Thus, bulges on the inner circumferential side of the return portions 30a that are positioned on the inner circumferential side are reduced, making the laminated core 39 easier to bend. Furthermore, because the return portions 30a that are positioned on the inner circumferential side do not project radially inward from the inner circumferential edges of the teeth 21c, interference between the bending jig and the coil end groups 22f and 22r in the step of bending the laminated core 39 is avoided.

Here, because the amount of offset of the return portions 30a that are positioned on the outer circumferential side is larger than the amounts of offset of the return portions 30a that are positioned on the inner circumferential side and centrally, the compression rate of the outer pressure plate 68 is greater than the compression rate of the inner pressure plate 67 in the step of compressing the coil ends, and the radial widths of the return portions 30a that are lined up in three rows in a radial direction naturally become sequentially narrower in order of the return portions 30a that are positioned centrally, the return portions 30a that are positioned on the inner circumferential side, and the return portions 30a that are positioned on the outer circumferential side.

Moreover, in the above embodiment, an automotive alternator has been explained, but similar effects are also exhibited when the present invention is applied to other automotive rotary electric machines such as automotive alternating-current generator-motors or automotive alternating-current motors.

In the above embodiment, slots are explained as being formed at a ratio of two slots per phase per pole, but the number of slots per phase per pole is not limited to two, and may also be one, for example. In that case, the winding assemblies are prepared by forming six wires into wave shapes. Three end portions of the wires each project outward on two sides at two ends of the winding assemblies.

In the above embodiment, the squared cross sections of the slot-housed portions have racetrack-shaped cross sections, but the squared cross sections are not limited to racetrack-shaped cross sections, and may also have rectangular cross sections, or square cross sections, for example. It is not absolutely necessary for corner portions of the rectangular cross sections and square cross sections to be perpendicular, and they may also have a rounded shape.

In the above embodiment, the winding assemblies are mounted into the stator core so as to be stacked in three layers in a radial direction, but the number of layers of winding assemblies may also be four layers or more. In that case, the radial widths of the return portions are sequentially narrower in order of return portions of central winding assemblies (those not at an innermost circumference or an outermost circumference), return portions of an inner circumferential winding assembly (at the innermost circumference), and return portions of an outer circumferential winding assembly (at the outermost circumference).

The invention claimed is:

1. An automotive rotary electric machine comprising a stator comprising:
    an annular stator core in which a plurality of slots that have openings on an inner circumferential side are disposed at a predetermined pitch circumferentially; and
    a stator winding that is constituted by a plurality of winding assemblies that are mounted into said stator core,
    wherein:
    said winding assemblies are configured by arranging wire pairs that are equal in number to a predetermined slot pitch so as to be offset from each other by a pitch of one slot, said wire pairs being formed by arranging two wires so as to be offset by said predetermined slot pitch from each other such that slot-housed portions are stacked, said wires being constituted by continuous wires that are formed into a pattern in which said slot-housed portions are linked by return portions and are arranged at said predetermined slot pitch, and adjacent slot-housed portions are offset by said return portions so as to alternately occupy an inner layer and an outer layer in a slot depth direction, and said slot-housed portions are plastically deformed so as to have a squared cross section;
    said stator winding is configured by mounting said winding assemblies into said stator core so as to be stacked in three or more layers in a radial direction such that said slot-housed portions line up in single columns in a slot depth direction inside said slots; and
    radial widths of said return portions of said winding assemblies that are mounted so as to be stacked in a radial direction are made sequentially narrower in order of return portions of a winding assembly that is positioned centrally, return portions of a winding assembly that is positioned on an inner circumferential side, and return portions of a winding assembly that is positioned on an outer circumferential side.

2. The automotive rotary electric machine according to claim 1, wherein radially adjacent return portions of said winding assemblies that are mounted so as to be stacked in a radial direction are in a state of surface contact with each other.

3. An automotive rotary electric machine manufacturing method comprising steps of:
    preparing winding assemblies that are configured by arranging wire pairs that are equal in number to a predetermined slot pitch so as to be offset from each other by a pitch of one slot, said wire pairs being formed by arranging two wires so as to be offset by said predetermined slot pitch from each other such that slot-housed portions are stacked, said wires being constituted by continuous wires that have circular cross sections that are formed into a pattern in which said slot-housed portions are linked by return portions and are arranged at said predetermined slot pitch, and adjacent slot-housed portions are offset by said return portions so as to alternately occupy an inner layer and an outer layer in a slot depth direction;
    preparing a rectangular parallelepiped laminated core in which slots are arranged at a predetermined pitch;
    plastically deforming said slot-housed portions of said winding assemblies that have circular cross sections so as to have squared cross sections;
    mounting said winding assemblies into said laminated core so that said winding assemblies are stacked in three or more layers and radial widths of said return portions of said winding assemblies stacked in a radial direction are made sequentially narrower in order of return portions of a winding assembly that is positioned centrally, return portions of a winding assembly that is positioned on an inner circumferential side, and return portions of a winding assembly that is positioned on an outer circumferential side;

preparing an annular stator core by bending into an annular shape said laminated core into which said winding assemblies are mounted so as to be stacked, and abutting and integrating by welding two end surfaces of said bent laminated core; and configuring a stator winding by connecting said wires of said winding assemblies, said automotive rotary electric machine stator manufacturing method further comprising steps of:

offsetting coil ends such that said return portions of said winding assemblies are offset by a predetermined amount relative to said slot-housed portions before said step of mounting said winding assemblies into said laminated core; and compressing said coils ends by compressing and plastically deforming groups of said return portions of said winding assemblies that are stacked in said radial direction by pressing from said inner circumferential side and outer circumferential side before said step of connecting said wires.

4. The automotive rotary electric machine manufacturing method according to claim 3, wherein an amount of offset of said return portions in said winding assembly that is positioned on said outer circumferential side is made greater in said step of offsetting said coil ends than an amount of offset of said return portions of said winding assembly that is positioned on said inner circumferential side and of said winding assembly that is positioned centrally.

5. The automotive rotary electric machine manufacturing method according to claim 4, wherein a compression rate of said return portions of said winding assembly that is positioned on said outer circumferential side is made greater in said step of compressing said coil ends than a compression rate of said return portions of said winding assembly that is positioned on said inner circumferential side.

* * * * *